(12) United States Patent
Ellis (10) Patent No.: US 11,547,082 B1
(45) Date of Patent: Jan. 10, 2023

(54) POWER BARN SYSTEM

(71) Applicant: Mark Ellis, Orange, CA (US)

(72) Inventor: Mark Ellis, Orange, CA (US)

( * ) Notice: Subject to any disclaimer, the term of this patent is extended or adjusted under 35 U.S.C. 154(b) by 0 days.

(21) Appl. No.: 17/665,421

(22) Filed: Feb. 4, 2022

Related U.S. Application Data (63) Continuation of application No. 17/572,416, filed on Jan. 10, 2022.

(60) Provisional application No. 63/251,715, filed on Oct. 4, 2021.

(51) Int. Cl.
| | | |
|---|---|---|
| *A01K 1/00* | (2006.01) | |
| *A01G 9/14* | (2006.01) | |
| *A01G 9/18* | (2006.01) | |
| *H02K 7/18* | (2006.01) | |
| *H02S 10/10* | (2014.01) | |
| *H02S 20/32* | (2014.01) | |
| *A01G 7/04* | (2006.01) | |
| *A01G 9/24* | (2006.01) | |
| *F02C 6/00* | (2006.01) | |

(52) U.S. Cl.
CPC ............ *A01K 1/0052* (2013.01); *A01G 7/045* (2013.01); *A01G 9/243* (2013.01); *A01G 9/249* (2019.05); *F02C 6/00* (2013.01); *H02K 7/1823* (2013.01); *H02S 10/10* (2014.12); *H02S 20/32* (2014.12); *F05B 2220/708* (2013.01)

(58) Field of Classification Search
CPC ...... A01K 1/0052; A01K 1/0047; A01G 9/00; A01G 9/14; A01G 9/18; A01G 9/24
See application file for complete search history.

(56) References Cited

U.S. PATENT DOCUMENTS

| | | | |
|---|---|---|---|
| 6,237,284 B1 | 5/2001 | Erickson | |
| 7,989,507 B2 | 8/2011 | Rising | |
| 8,071,342 B2 | 12/2011 | Herrama et al. | |
| 8,915,015 B1 * | 12/2014 | Augspurger | A01G 9/14 47/17 |
| 9,397,361 B2 | 7/2016 | Papile | |

(Continued)

FOREIGN PATENT DOCUMENTS

| | | | |
|---|---|---|---|
| CN | 201132833 | | 10/2008 |
| CN | 204191354 U | * | 3/2015 |

(Continued)

OTHER PUBLICATIONS

Zhao translation, Nov. 11, 2016, retrieved from EPO May 18, 2022, (Year: 2016).*

*Primary Examiner* — Kristen C Hayes (74) *Attorney, Agent, or Firm* — Clay McGurk; The Law Office of Clay McGurk (57) ABSTRACT

The power barn system provides a way to eliminate greenhouse gas (GHG) emissions from livestock. The power barn system seals and traps the methane gas that is emitted from the livestock and converts the methane into electric power and carbon dioxide to enhance plant growth. The power barn system uses PV solar arrays and plastic sheeting to make sealed, airtight structures. The carbon dioxide is provided to one or more sealed greenhouse areas. The plants use the carbon dioxide and release oxygen, thereby completely eliminating greenhouse gas emissions from livestock. The power plant uses the methane at peak times at night while solar panels supply power during the day producing zero emission and 24/7 electricity at better than market rates.

18 Claims, 5 Drawing Sheets

(56) References Cited

U.S. PATENT DOCUMENTS

| | | | |
|---|---|---|---|
| 9,504,952 B2 | 11/2016 | Olah et al. | |
| 2010/0218507 A1 | 9/2010 | Cherson | |
| 2022/0071167 A1* | 3/2022 | De Bruin | ............. A01K 1/0047 |

FOREIGN PATENT DOCUMENTS

| | | | | |
|---|---|---|---|---|
| CN | 106155019 A | * | 11/2016 | |
| CN | 106973798 A | * | 7/2017 | |
| CN | 108285363 | | 7/2018 | |
| CN | 110465534 | | 11/2019 | |
| CN | 211793595 U | * | 10/2020 | |
| CN | 213127518 U | * | 5/2021 | |
| WO | 2003006387 | | 1/2003 | |
| WO | 2013089544 | | 6/2013 | |
| WO | WO-2019023896 A1 | * | 2/2019 | ............... A01G 9/24 |

* cited by examiner

POWER BARN SYSTEM

RELATED APPLICATIONS

This application is a continuation of U.S. patent application Ser. No. 17/572,416 filed on Jan. 10, 2022, which claim priority to U.S. Provisional Application Ser. No. 63/251,715, filed Oct. 4, 2021, all of which are incorporated by reference herein.

BACKGROUND OF INVENTION

Greenhouse gases have far-ranging environmental effects on ecosystems around the world, and on plants and animals that inhabit them. Greenhouse gases contribute to climate change by trapping heat inside Earth's atmosphere causing severe droughts, extreme weather, food supply disruptions, and increased wildfires. The largest source of greenhouse gas emissions from human activities in the United States is from burning fossil fuels for electricity, heat, and transportation. Livestock, such as cattle or are responsible for 14.5 percent of global greenhouse gases in the world and around 10 percent in the United States. Livestock, especially ruminants such as cattle, produce methane ($CH_4$) as part of their normal digestive processes. This process is called enteric fermentation. There is a great urgency for ways to shrink livestock's methane worldwide.

SUMMARY OF THE INVENTION

This invention eliminates the methane emitted by livestock and minimizes the $CO_2$, by combining agriculture farming, livestock farming, solar farms, and peaker power plants. The agriculture farming and livestock farming are contained inside a sealed enclosure. This invention leads to many synergies.

Peak Solar Farm—Grain, Vegetable and Fruit Production

Solar is a great low-cost renewable power source. There may be cost advantages to setting up on farm land as opposed to raw land. A plant does not need 100% of the sunlight it receives. Seventy-five percent of sunlight is adequate for plants to grow fully. The excess just requires more transpiration for cooling. There are many plants that prefer partial or full shade and many plants grow much better in overcast conditions. Adding a solar farm with 25% coverage means that the plants get the full amount of sun they need and 25% gets converted to power. This is called agri-voltaics.

Carbon dioxide is food for plants. Enhancing carbon dioxide in air near farms is of great benefit. However, carbon dioxide will simply diffuse into the atmosphere and therefore must be contained. Elevated $CO_2$ could be contained in greenhouses leading to enhanced plant growth because plants would convert $CO_2$ to oxygen. A plant-only version of peak solar farm would need to purge oxygen to the environment periodically and be resealed and recharged with carbon dioxide.

It would be extremely expensive to put all plant agriculture in traditional greenhouses. There would need to be something to reduce or offset that cost or there would be a disruption to the market. The structure of a solar farm also allows a frame for plastic sheeting to enclose the space and seal it. This improves moisture retention and contains the injected carbon dioxide. Higher carbon dioxide and humidity provides better plant growth and better crop yields.

Generating power is a way to add revenue to farmers using solar and natural gas power generation. Natural gas "peaker" power plant provides a constant source of power. The sun doesn't shine at night, so solar provides no power at night. This is when the natural gas generator turns on to even out the load. This provides added income to the farmland. The exhaust gas from natural gas is carbon dioxide and water vapor. This is then pumped into the greenhouse to improve crop yields. Natural gas is 90% methane.

The power barn provides 4 added levels of efficiency available as well. First, 24/7 power means you can add grow lights at night and potentially double the growing time of the plants. In some crops this could mean a doubling of output. Second, a sealed environment excludes things like weeds, pests, & disease. Using less weed killer insecticides and other antibiotic treatments lowers the overall toxicity of food production and saves farmers money on these expenses. Third, a sealed carbon dioxide rich environment is warmer, reducing frost damage in northern climates. Fourth, the power farm retains moisture better. It is predicted that future weather patterns will be more severe, both dry and cold. The Rocky Mountains may not get as much snowpack as it has in the past. Severe drought may hit the heartland breadbasket as it has already hit Texas and Arizona.

Peak Barn Farm—Meat Production

Carbon capture, specifically methane capture, is impossible without a method of containing the gas. This requires enclosing a space inhabited by cows. Methane capture is made more economical to transport if it is concentrated. Methane can be super cooled and this will result in methane condensing out as a liquid. These require relatively large inputs of energy; often more than 50%. With power barn there is no need to transport the methane because it will be use onsite.

The best way to reduce methane and nitrous oxide gases in air is to combine that air with enough fuel to achieve combustion. Pairing methane and nitrous oxide gases filled air from a barn with a peaker plant recovers all the energy possible without the need to compress or condense the methane. Again methane will drift away if not contained. In fact Methane is lighter than air and will rise like a balloon. The solar farm combined with plastic sheeting contains the methane and nitrous oxide gases from cow emissions.

Livestock also breathe oxygen and exhale carbon dioxide so including feed grasses within their greenhouse would provide part or all of their food. This portion is relative to plant growth. Thus the number of livestock can be balanced to provide 100% of food and oxygen needed within the power barn. This closed loop system includes the inputs of light and water while the outputs are beef, fertilizer, and power.

Peak Barn—Integration

Clearly there is a benefit to integration of these two forms of farming. Grain or grass production could mean more cattle in the meat farm. This would yield better returns. Fertilizer is an output for livestock but an input for crop production. Also if carbon dioxide is channeled down one aisle of crops and back up the next, the net result would be a diminished carbon dioxide component and an enhanced oxygen component within the air. That could ensure cows get enough oxygen. The excess oxygen also makes the peaker power plant more efficient.

In one embodiment, a power barn system comprises an enclosed structure having a first enclosed area for growing plants and a second enclosed area for livestock that emit methane; a solar panel system including a plurality of solar panels attached on top of the enclosed structure; a methane capture and release system (MCRS) that captures the methane in the second enclosed area; and power plant system connected to the MCRS and capable of converting methane into carbon dioxide and electricity.

In one embodiment, a power barn system comprises an enclosed structure having a first enclosed area for growing plants and a second enclosed area for livestock that emit methane, the first enclosed area and the second enclosed area being substantially sealed and substantially airtight where methane is trapped at the top of the second enclosed area; a solar panel system including a plurality of solar panels attached to the enclosed structure; a methane capture and release system (MCRS) having ductwork with two ends, the first end having openings that captures the methane in the second enclosed area; and power plant system attached to one end of ductwork of the MCRS and capable of converting methane into carbon dioxide and electricity.

In one embodiment, a power farm system comprises a plurality of solar panel arrays raised high enough to grow plants underneath; a greenhouse covered by plastic sheeting where some of the solar panels arrays are attached to the outside of the greenhouse; gas sensors monitor the oxygen and carbon dioxide inside the greenhouse; an inlet valve allowing carbon dioxide to flood the inside of the greenhouse thereby promoting plant growth while acting as a carbon sink; an outlet valve for allowing the periodic discharge of oxygen rich air either to be sold to industry or vented to the environment.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings. It is to be understood that both the foregoing general description and the following detailed description are exemplary and explanatory and are intended to provide further explanation of the invention as claimed and not to limit it.

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE INVENTION

Figure 1:
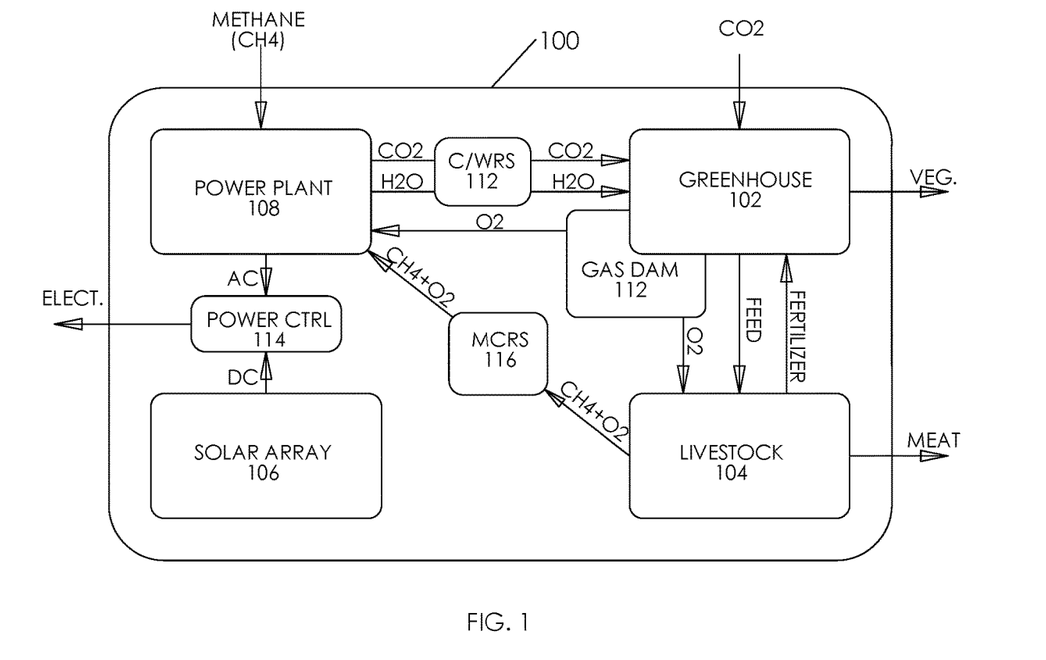
FIG. 1 illustrates a diagram of the different parts of the power barn according to a preferred embodiment of the invention.

FIG. 1 shows a diagram of the power barn 100 and the different system components of the power barn 100 according to one embodiment of the present invention. The power barn 100 comprises a greenhouse 102, a barn 104, a solar power system 106, a power plant 108, a gas dam 110, a carbon/water capture and release system 112 ("C/W CRS 112)", a power control system 114, and a methane capture and release system 116 ("MCRS 116").

The greenhouse 102 comprises one or more enclosed (e.g., airtight, sealed) areas where plants are grown, such as a greenhouse for example. The enclosed areas are airtight and sealed at the top, edges and around the bottom. The greenhouse 102 is enclosed with plastic sheeting, glass, or other substantially transparent or partially transparent materials that prevents outside air from entering and indoor air from exiting. The plants are grown in soil whether in the land or in containers above the land. The plants are fed water from the power plant 108 via the C/WCRS 112. C/WCRS 112 also may be connected to an outside water supply. The plants can be fertilized with the waste of the livestock. The plants can be grown as a source of food for the livestock and/or humans or for other human consumption. The plants in the greenhouse 102 can be any type of one or more vegetables, fruits, herbs, flowers, grasses, grains, etc.

Most green plants use the process known as photosynthesis where the plants use sunlight to synthesize food from carbon dioxide and water. Photosynthesis in plants generally involves the green pigment chlorophyll and generates oxygen as a byproduct. Oxygen produced by the plants is captured by the gas dam 110 from the greenhouse 102 and can be used by the power plant 108 to generate electricity or as the air for the livestock to breathe.

The barn 104 is also enclosed like the greenhouse 102 and can comprise one or more enclosed areas. The barn's enclosed areas are sealed and airtight to capture substantially all the methane from the cows or livestock. For example, livestock may be housed in one enclosed sealed area while in a different enclosed sealed area, pigs are housed. The barn 104 is enclosed with plastic sheeting or other materials that prevents outside air from entering and indoor air from exiting. By using an enclosed space, methane produced by the cattle or livestock is captured by the MCRS 116 for use by a generator or turbine generator to generate electricity by power plant 108.

The preferred livestock for the barn 104 are cows or cattle as they produce the largest amount of methane. Ruminant livestock (cattle, sheep, buffalo, goats, deer and camels) have a fore-stomach (or rumen) that contains microbes called methanogens. Such livestock are capable of digesting coarse plant material and in turn produce methane as a by-product of digestion (enteric fermentation). This methane is released to the atmosphere by the animal belching and flatulence. The amount of methane emitted by livestock is primarily driven by the number of animals, the type of digestive system they have and the type and amount of feed consumed. Ruminants are the principal source of livestock methane emissions because they produce the most methane per unit of feed consumed.

The livestock in the barn 104 are fed food from the greenhouse 102 or a food source outside the power farm 100. The waste from livestock can be used as a fertilizer for the plants in the greenhouse 102. The livestock which live in the barn 104 can be slaughtered for meat for human or other animal consumption.

The solar power system 106 uses photovoltaic (PV) solar panels. Solar panels are the roof of the greenhouse 102 and/or the barn 104. The sun's rays shine onto the PV solar panels. Energy from the sunlight is absorbed by the PV cells in the solar panels to create electrical charges that move in response to an internal electrical field in the cell, causing electricity to flow. The electrical charges are converted by the solar power system 106 into AC power for use by the power barn 100 for providing a source of electricity for the greenhouse 102 or the barn 104 or supplied to the grid.

The power plant 108 is comprised of a natural gas engine or turbine, that supplies mechanical energy to an electric power generator, the engine operates from methane fed by the MCRS 116, natural gas as provided from a source outside the power barn 100 and oxygen from plants that flows over the gas dam 110. Output from the power plant 108 is carbon dioxide and water which is supplied to greenhouse 102 by the C/W CRS 112 respectively.

The power plant 108 can be operated from the cow methane emissions entirely; but if methane is captured in high concentration, there is a risk of fire plus the high concentration of methane will make cows ill. Thus power plant 108 may be supplemented with natural gas (or other gases) to boost the concentration of methane supplied by the barn 104. The power 108 plant emits $CO_2$ and water, while electric power is exported out of the system to the electrical grid. The solar power system 106 emits power and provides shade so the power barn system 100 doesn't get too hot. In one embodiment, the solar panels of solar power system 106 produce electricity during the day and the power plant 108 produces energy during the night.

Gas dam 110 is plastic sheeting or other plastic or micro-fiber materials that restrains $CO_2$ (which is heavier than air) and allows the $CO_2$ to pool in the plant growing section of the greenhouse 102. Plants produce oxygen which is lighter than $CO_2$. Oxygen flows up and over the gas dam into the air in the greenhouse 102 and supplies the oxygen to the barn 104 for the livestock and combustion by the power plant 108.

Power control system 114 receives AC power which is generated from the power plant 108 and DC power which is generated by the solar array system 106. Power control system 114 receives the DC power and converts the DC power into AC power. Power control system 114 outputs electricity (AC power) for power barn 100 and for other structures around the power barn 100.

Figure 2:
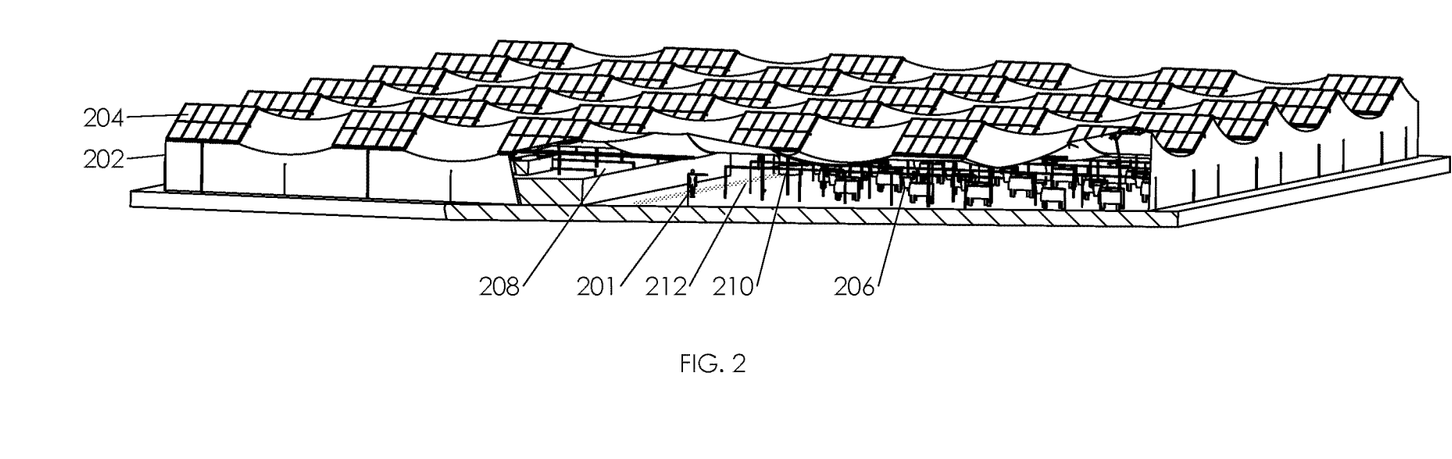
FIG. 2 illustrates an angled view with cutaway of a power farm according to one embodiment of the present invention.

FIG. 2 illustrates an angled view with cutaway of a power farm 100 according to one embodiment of the present invention. A person 201 is shown in FIG. 2 for scale. As shown in FIG. 2, the power farm 100 comprises one enclosed structure with multiple, separately enclosed areas. The power farm 100 is constructed from plastic sheeting 202 framed on a wood, steel or plastic structure that holds the plastic sheeting in place. The plastic sheeting 202 can be clear sheeting or any type of sheeting. The plastic sheeting 202 is used between the array of solar panels 204 and around the perimeter of the power farm 100. The enclosed structure seals the gases such as methane, carbon dioxide and oxygen inside the power barn 100.

The roof of the power farm 100 is an array of ten photovoltaic solar panels 204 that are connected to the solar power system 106. The array is arranged in a group of five by two PV solar panels, each adjacent to the others. This group of ten solar panels 204 is arranged on the roof of the power barn 100 in a matrix of six by six groups. In alternative embodiments, the array of PV solar panels can be larger or smaller than 10, and the matrix can be larger or smaller than the six by six arrangements.

In the cutaway section, there are segregated areas, one or more separately enclosed barn areas 206 for livestock, such as cows for example, and one or more separately enclosed greenhouse areas 208 for plants. The enclosed barn areas 206 functions as the barn 104 (FIG. 1). There can be multiple barn areas 206 that house different type of livestock, each separately enclosed by each area 206 or one enclosed area 206 with different fencing or barriers between the different livestock. The enclosed area or areas 208 functions as the greenhouse 102 (FIG. 1). There can be multiple greenhouse areas 208 that grow different types of plants or the same type of plant.

As shown in FIG. 2, the power plant 210 is centrally located between the barn areas 206 and the greenhouse areas 208. Although the power plant 210 may be located inside the enclosed areas, it can also be housed in a separate structure from the barn areas 206 and greenhouse areas 208.

The utility lines 212 comprises utility lines for supplying different liquids or gases to the power barn 100. For example, in one embodiment, utility lines 212 comprised of water for crops, natural gas utility lines for the power plant 108 and electricity utility lines for sending electrical power generated by the power barn facility 100.

Figure 3:
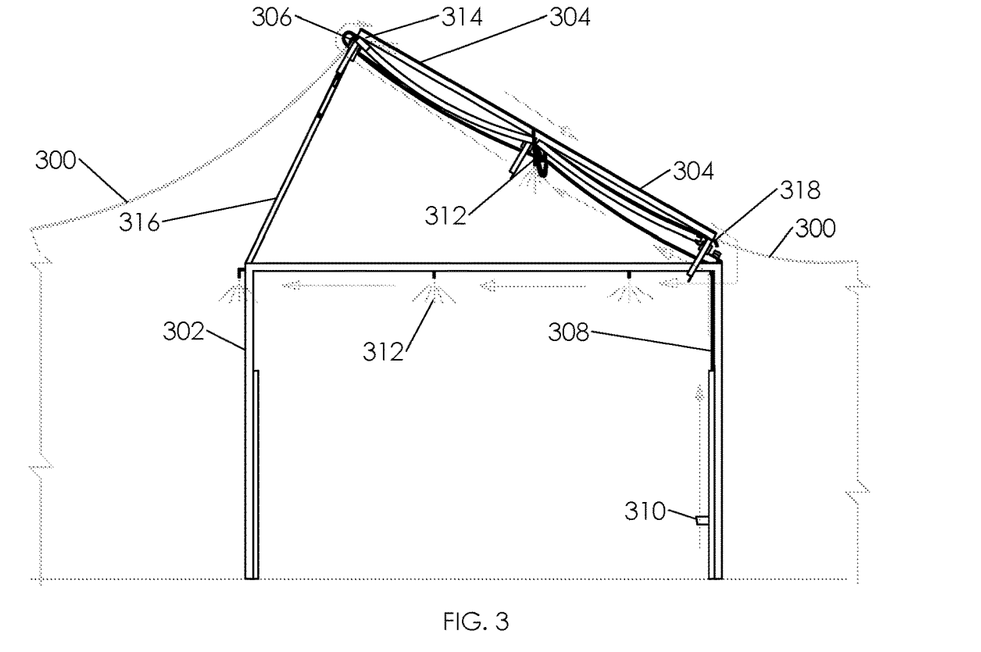
FIG. 3 illustrates a cutout of one section of the power barn solar panel according to one embodiment of the invention.

FIG. 3 shows a cutout of one section of the power barn 100 according to one embodiment of the invention. The plastic sheeting 300 is placed on the outside of the power farm 100. The structure 302 is made of wood, steel, plastic or other materials and provides necessary support for the plastic sheeting 300 and the PV solar panels 304 mounted on top of the roof. There are one or more seals 306 at the top of the structure 302 that traps air and gases. These seals 306 run along the PV solar panels 304 and the plastic sheeting.

FIG. 3 shows some of the plumbing 308 that provide water in the power barn 100. The plumbing 308 can be made from pipes whether plastic or metal. The piping 308 runs along the side of the structure 302 and in the cross-beam and roof areas. The piping 308 attaches to spigots 310, sprinklers 312 and sprayers 314. The carbon/water capture and release system 112 (FIG. 1) is comprised of the plumbing 308, spigots 310, sprinklers 312 and sprayers 314. Spigots 310 are attached to the piping 308 for providing water for livestock. Spigots 310 can be connected to a hose. Sprinklers 312 are connected to the piping 308 for watering plants or cooling the livestock. Sprayers 314 are mounted on the top of the roof and are connected to the piping 308. Sprayers 314 are used to clean and/or clean the solar panels 304. The sprinklers 312 and sprayers 314 can be activated by an electronic timer (not shown) or by manual turn off, turn on valves (not shown).

In FIG. 3, PV solar panels 304 are controlled or tilted by actuator 316. The actuator 316 can be manually controlled as shown in FIG. 3 or electronically controlled. Gutters 318 catch water when the PV solar panels 304 are cleaned, cooled via sprayers 314 or when it rains.

Figure 4:
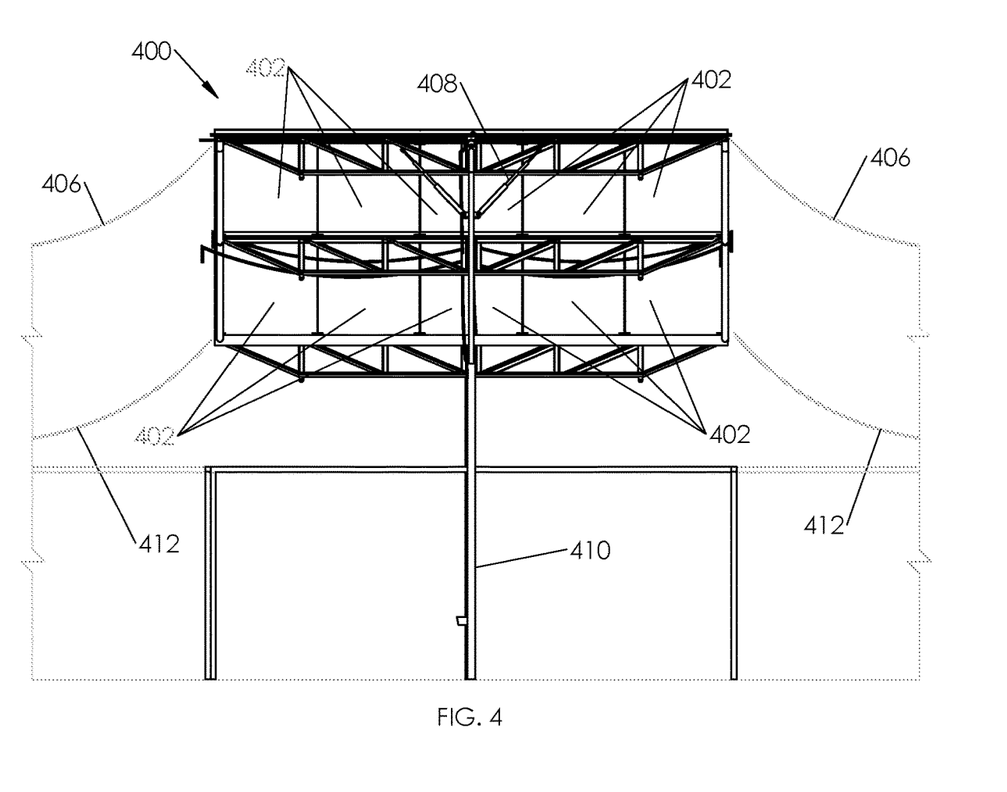
FIG. 4 illustrates a backside view of a matrix of five by two photovoltaic solar panels according to an embodiment of the invention with routing of water lines and methane collection ducts.

FIG. 4 illustrates an underside view of five by two PV solar panels 400 according to an embodiment of the invention. FIG. 4 illustrates the power barn 100 from a different perspective of FIG. 3. There is a PV solar panel 402, where the matrix of five by two PV solar panels 400 are adjacent to its neighboring PV solar panels. The bracing structure 404 attach each of the PV solar panels 400 to each other and provide support for the PV solar panels 400 to the plastic sheeting 406 on top of the roof of the power barn 100. The actuators 408 manually adjust or tilt the PV solar panels 400 by adjusting arm 410 so the PV solar panels substantially remain perpendicular to the location of the sun. Alternatively, the actuators 408 could be electronically controlled (not shown) versus the manual controls 410. The droop 412 on each side of the PV solar panels 400 is shown in FIG. 4.

Figure 5:
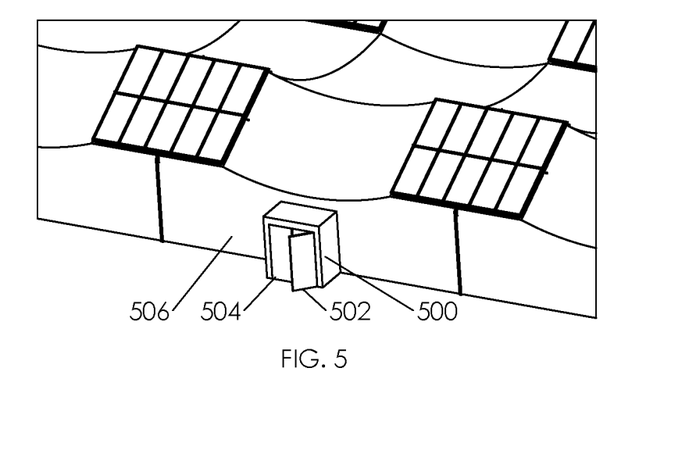
FIG. 5 illustrates a doorway in the power barn according to an embodiment of the present invention.

FIG. 5 illustrates a doorway 500 in the power barn according to an embodiment of the present invention. The doorway 500 is comprises of a pair of doors 502 and a frame 504. When closed, the outside of the doorway 500 is sealed with or against the plastic sheeting 506 on the outside structure of the power barn 100. The purpose of the sealed doorway 500 is to allow people or livestock from entering or exiting the power barn 100 with a minimum of gases from escaping. In alternative embodiments, the doorway 500 can be larger (e.g., like a garage door) or smaller (e.g., one door), and the number of doors can be any number. When the door(s) is closed, no air can escape, keeping the gases trapped inside the power barn 100.

Figure 6:
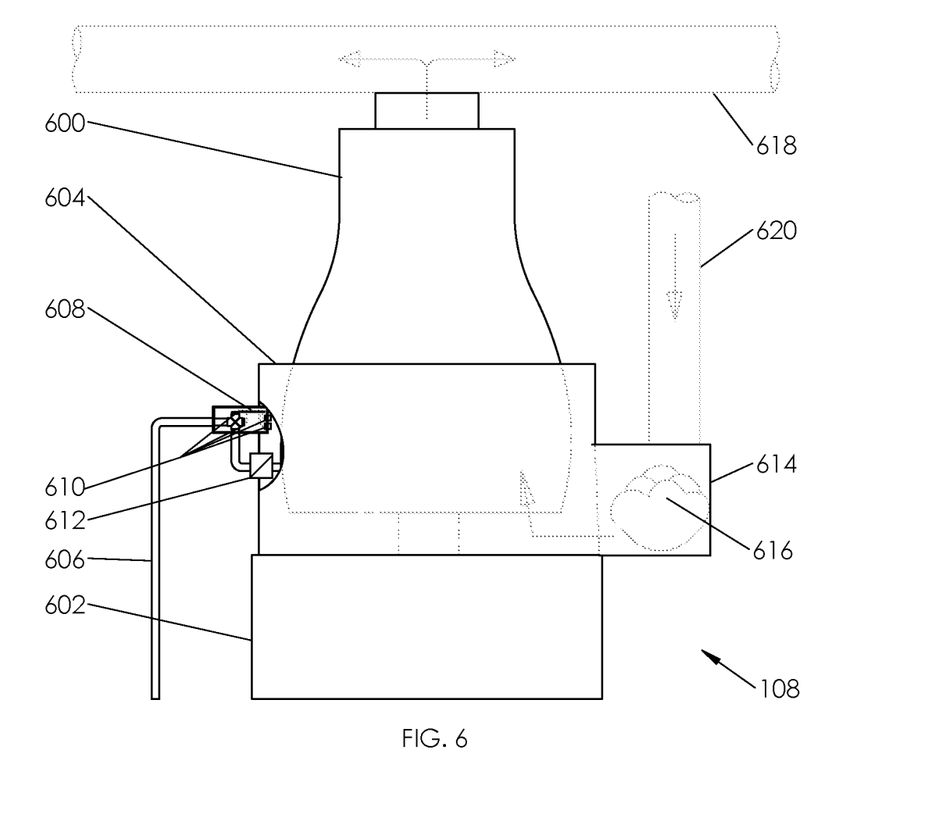
FIG. 6 illustrates parts of a power plant according to an embodiment of the present invention.

FIG. 6 illustrates parts of a power plant 108 according to an embodiment of the present invention. One of the main purposes of the power plant 108 is to convert methane gas into power and carbon dioxide, a less potent greenhouse gas. The power plant 108 comprises a natural gas engine or turbine 600, electric generator 602, air manifold 604, gas inlet 606, compute module 608, gas sensors 610, and metering valve 612, and filter box 614, filter material 616, exhaust ductwork 618, methane-air ductwork inlet 620. The power plant is primarily operated using methane-enriched air supplemented with utility natural gas that is supplied by gas inlet 606. To make a stoichiometric perfect combustion. The methane enriched air is from the methane trapped and captured in the barn 104 (FIG. 1) which is supplied to the power plant 108 via the air inlet 620. The methane to air ratio percentage falls within the range 4-6% for methane and the 94-96% for air. Methane-enriched air travels through air inlet 620 to filter box 614. Filter box 614 takes the methane-enriched air and removes bio-derived methane contaminants using filter material 616. The filter material is 616 is steel wool or other hydrogen sulfide absorbing material and prevents corrosion. Ductwork 618 is the ductwork that channels exhaust from the turbine 600 to water filters. Methane collection ducts 620, collects the methane from the top of the solar panels as methane is lighter than air. Ductwork 618 may have electronically controlled fans (not shown) inside the ductwork 618 to help move the methane-air from the barn 104 into the power plant 108. The fans help regulate the movement of the methane along the ductwork 618.

The 4-6% of methane in the methane=enriched air that is filtered by filter 614 is provided to the air manifold 604 of the turbine 600. The gas sensors 610 senses the amount of methane being output by the filter 614 and outputs the gas concentration levels to the compute module 610. The compute module 610 interprets the sensor data and controls the metering valve 608 to ensure proper fuel-air mixture goes to the turbine 600 of the power plant 108.

Figure 7:
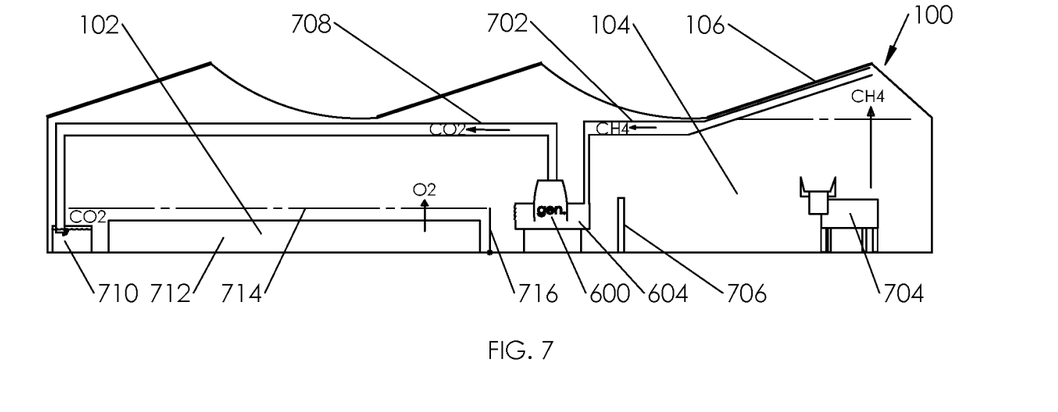
FIG. 7 shows a cut-away view of the power barn illustrating the gas path of circulation according to one embodiment of the present invention.

FIG. 7 shows a cut-away view of the power barn 100 according to one embodiment of the present invention. The methane capture and release system 116 (FIG. 1) is comprised of the ductwork 702 shown in FIG. 7. One end of the ductwork 702 is open around the inside top of the power barn 100. Livestock or cows 704 emit methane which is lighter than air. Methane rises inside the power barn 100 and collects inside the peaks of the solar panel array as shown in FIG. 7. A pump (not shown) may collect the captured methane and pump the methane to the power generator 604 (FIG. 6) of the power plant 108. The pump may run at certain pre-programmed times or based on utility price signals from utilities companies to generate electricity. A fence or other barrier 706, keeps the livestock away from the power plant 108 and the greenhouse areas 102.

The power plant 108 converts the methane into carbon dioxide. The exhaust line is connected to the power plant 108 and captures the carbon dioxide which is distributed to the plants in the greenhouse 102, via ductwork and/or pipes 708. The carbon/water dioxide capture and release system 112, (FIG. 1) is comprised of the ductwork and/or pipes 708. Additionally there can be valves or fans (not shown) as controlled by a programmable, compute module 608, that distributes the carbon dioxide to different areas of the greenhouse 102 at specified times. The valves would route the carbon dioxide by blocking or opening the ductwork 708.

The end of the ductwork 708 is fed into a water filter 710. This cools the exhaust gas so that the carbon dioxide settles like a fog, the water filter also removes any soot or other exhaust product that are not substantially carbon dioxide as soot and other exhaust products tend to damage plants.

Plants 712 are grown in the greenhouse 102 areas of the power barn 100. Plants 712 convert carbon dioxide and release oxygen. Oxygen is lighter than carbon dioxide and will rise to the top of the greenhouse 102, while the carbon dioxide will remain below in area 714. Gas dam 716, allows dense carbon dioxide to pool in higher concentration in the greenhouse area away from the cows. The oxygen, being lighter, will flow over the gas dam from the greenhouse area to the barn and turbine and thus passively allows for both high carbon dioxide levels for plants, and high oxygen for the livestock or cows and the power plant 108. These systems do not use expensive processes like compression or cryogenic separation.

Figure 8:
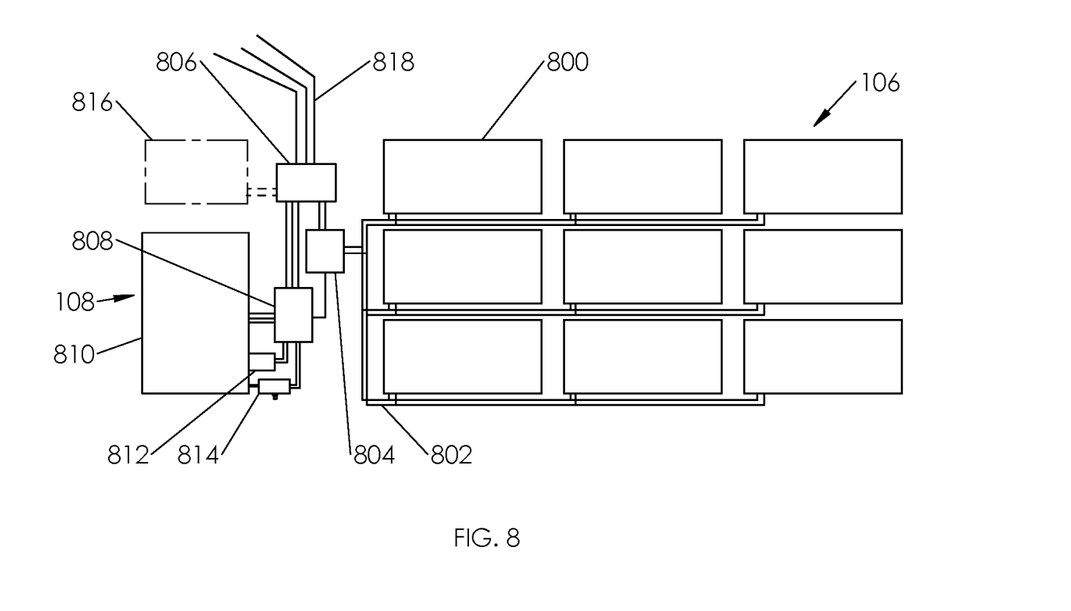
FIG. 8 illustrates the electrical block diagram of the solar power system and the power plant according to one embodiment of the present invention.

FIG. 8 illustrates how the solar power system 106 and the power plant 108 are tied together and supplies power to the electrical grid according to one embodiment of the present invention. There must be conversion from low voltage to high voltage and from direct current (DC) to alternating current (AC) The solar panels 800 (shown in an array of 3×3), generate DC voltage that is transmitted via wires 802 to a power inverter 804. The power inverter 804 converts the DC voltage to AC. The power inverter 804, is connected to the transformer 806, which changes low voltage to high voltage, and the compute module 808, which controls the system according to the users' preference.

The compute module 808, has 3 main tasks: monitor the system, turn on the generator, and when on it computes the perfect gas air mixture. Typically the power plant 108, operates at nighttime where there is no sunlight. The compute module can operate by timer, by gas levels, or by signals from electricity utility company's power or price demand or some combination thereof.

The compute module 808 receives information (gas concentrations) from the gas sensor inputs 812 (gas concentrations), and determines If the system's gases are within normal levels. If not, the compute module takes action to return levels to normal by either running the power plant, turns fans on, or opens vents to outside air to ensure livestock and plant health.

During normal operation, sensors are used to compute how much natural gas should be used from the utility lines (i.e., outside source) and how long to run the power plant. Cows are capable of producing more than 5% concentration of methane. However, 5% is not enough to burn on its own inside the power plant 108. For fire safety, methane levels are kept to about 4-6%. The range for a good combustion inside the turbine 600 is between 10-20% where 15% concentration is considered perfect for combustion. The computer module 808 via the sensors detects the methane after being filtered by filter 614 and adds natural gas or another gas known to those skilled in the art to achieve around the 15% concentration for the turbine 600. The compute module 808, controls the metering valve 814, to ensure that the metering valve always supplies the correct amount of methane concentration whenever the power plant is on.

An optional battery or other energy storage device may be added to provide storage for use at peak demand times, storing power while solar power is plentiful during the day.

Peak solar farm is a simplified cousin of Power barn. Peak solar farm comprises agri-voltaics: a solar farm on top of a vegetable farm but enclosed airtight with plastic sheeting. The farm is flooded with waste carbon dioxide and this promotes plant growth while eliminating vermin of all types. Peak solar farm also includes grow lights to promote plant growth at night. The sheeting keeps moisture inside and therefore the system uses less water. of course the plants use up the carbon dioxide and there will be oxygen at high levels so the enclosure has to be purged of oxygen periodically, and recharged with carbon dioxide.

While the invention has been described in detail and with reference to specific embodiments thereof, it will be apparent to those skilled in the art that various changes and modifications can be made therein without departing from the spirit and scope thereof. Thus, the present invention includes the modifications and variations of this invention provided they come within the scope of the appended claims and/or their equivalents.

What is claimed is:

1. A power barn system comprising:
    an enclosed structure having a first enclosed area for growing plants and a second enclosed area for livestock that emit methane, where the second enclosed area is sealed and airtight for trapping methane at the top of the second enclosed area;
    an exterior solar panel system including a plurality of solar panels, wherein each solar panel is attached to one of a plurality of peaks of the enclosed structure;
    a methane capture and release system (MCRS) that captures the methane in the second enclosed area; and
    power plant system connected to the MCRS and capable of converting methane into carbon dioxide and electricity.

2. The power barn system as in claim 1, wherein the first enclosed area is sealed and airtight for trapping carbon dioxide and oxygen, and further comprises a gas dam for separating the carbon dioxide and oxygen.

3. The power barn system as in claim 1, wherein the solar panel system comprises an actuator for tilting the solar panels towards the sun.

4. The power barn system as in claim 1, wherein the MCRS comprises ductwork located at the top of the second enclosed area and openings in the ductwork to receive the methane, the ductwork connected to the power plant system.

5. The power barn system as in claim 1, wherein the power plant system is connected to the MCRS and comprises:
    a turbine;
    a generator connected to the turbine;
    an air manifold connected to the generator;
    a compute module connected to the generator;
    a gas inlet coupled to the generator and an external source; and
    a filter box connected to the MCRS and the generator.

6. The power barn system as in claim 5, wherein the external source is natural gas and wherein compute module regulates the amount of first gas that is added to the power plant.

7. The power barn system as in claim 6, wherein compute module, gas sensors, and metering valve regulates the methane and the first gas mixture between 10 percent to 20 percent.

8. The power barn system as in claim 7, wherein the first gas is natural gas.

9. The power barn system as in claim 1, further comprising multiple doors that seal the enclosure when closed.

10. The power barn system as in claim 1, further comprising ductwork having two ends, where a first end attaches to the power plant system and a filter system, a second end of the ductwork is attached to highest points of the second enclosed area above the methane emitting livestock.

11. A power barn system comprising:
    an enclosed structure having a first enclosed area for growing plants and a second enclosed area for livestock that emit methane, the first enclosed area and the second enclosed area being substantially sealed and substantially airtight where methane is trapped at the top of the second enclosed area;
    an exterior solar panel system including a plurality of solar panels, wherein each solar panel is attached to one of a plurality of peaks of the enclosed structure;
    a methane capture and release system (MCRS) having ductwork with two ends, the first end having openings that captures the methane in the second enclosed area; and
    power plant system attached to one end of ductwork of the MCRS and capable of converting methane into carbon dioxide and electricity.

12. The power barn in claim 11, further comprising a plurality of grow lights that are attached to the first enclosed area.

13. A power barn system comprising:
    a first enclosed area for growing plants;
    a second enclosed area for livestock that emit methane, where the second enclosed area is sealed and airtight for trapping methane at the top of the second enclosed area; and
    an exterior solar panel system including a plurality of solar panels, wherein each solar panel is attached to one of a plurality of peaks of the enclosed areas;
    a methane capture and release system (MCRS) that captures the methane in the second enclosed area.

14. The power barn system of claim 13, further comprising a solar panel system including a plurality of solar panels attached on top of the first enclosed area and the second enclosed area.

15. The power barn system of claim 13, further comprising a power plant system connected to the MCRS and capable of converting methane into carbon dioxide and electricity.

16. The power barn system as in claim 13, wherein the first enclosed area is sealed and airtight for trapping carbon dioxide and oxygen.

17. The power barn system as in claim 16, further comprising a gas dam for separating the carbon dioxide and oxygen.

18. The power barn system as in claim 13, wherein the MCRS comprises ductwork located at the top of the second enclosed area and openings in the ductwork to receive the methane.

\* \* \* \* \*